Sept. 28, 1954　　　C. S. DRAPER ET AL　　　2,690,014
LEAD ANGLE COMPUTER FOR GUN SIGHTS
Filed March 29, 1941　　　　　　　　　　　3 Sheets-Sheet 1
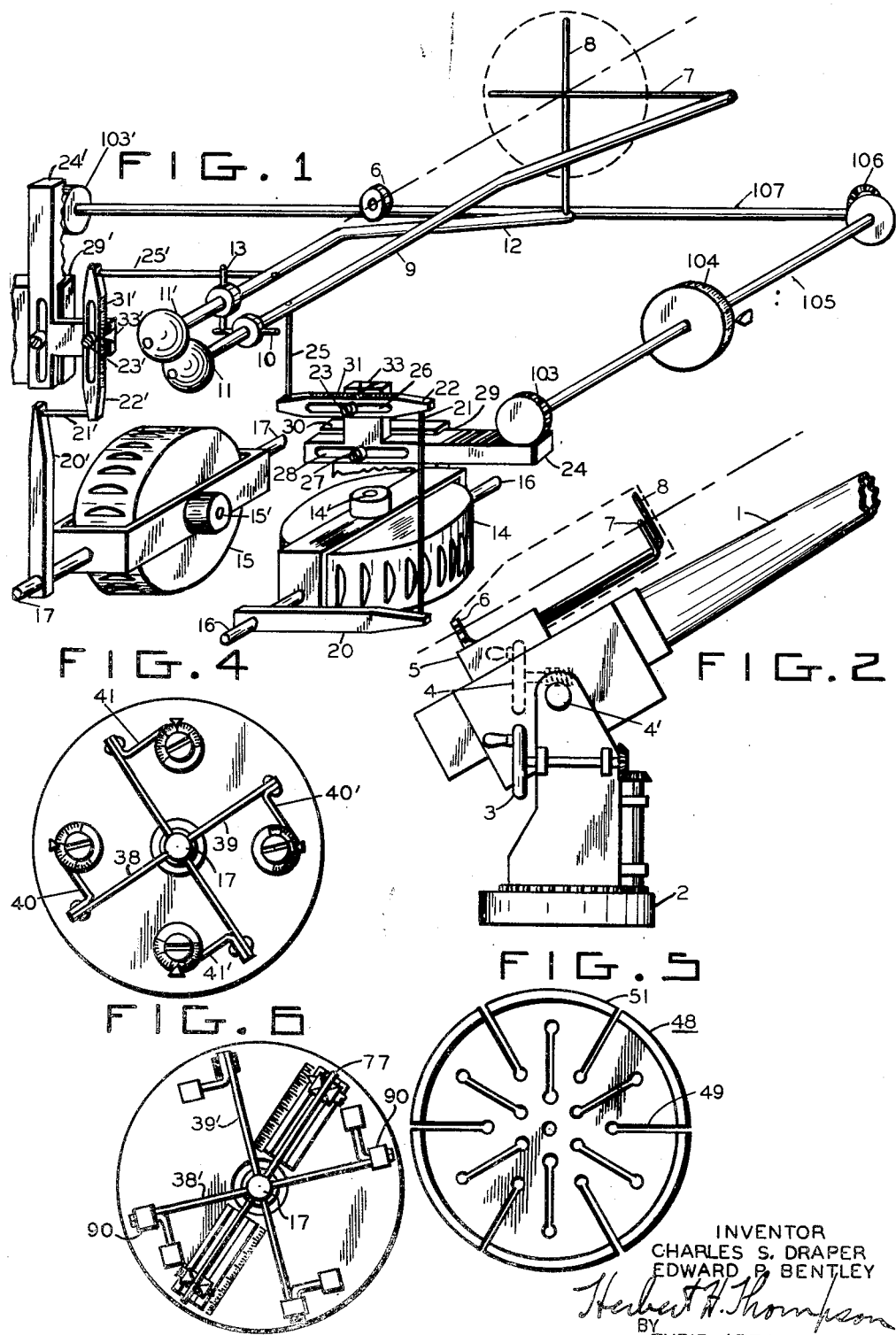
INVENTOR
CHARLES S. DRAPER
EDWARD P. BENTLEY
BY Herbert H. Thompson
THEIR ATTORNEY Sept. 28, 1954 C. S. DRAPER ET AL 2,690,014
LEAD ANGLE COMPUTER FOR GUN SIGHTS
Filed March 29, 1941 3 Sheets-Sheet 2
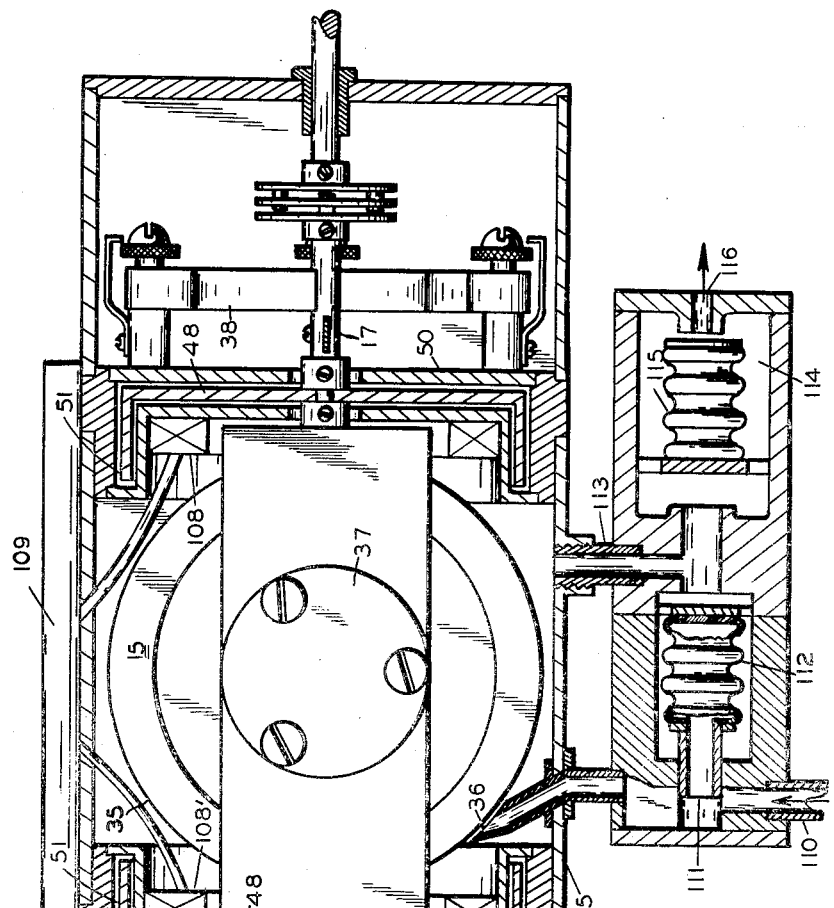
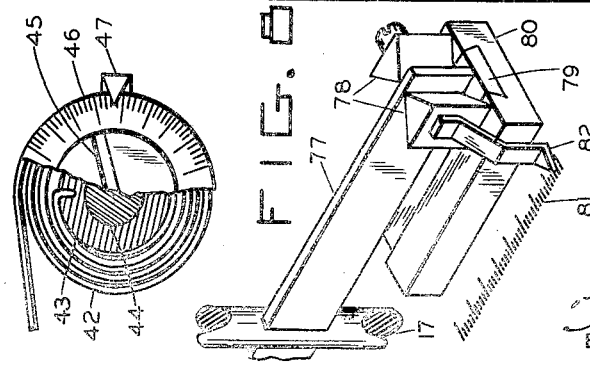
INVENTOR
CHARLES S. DRAPER
EDWARD P. BENTLEY
BY
THEIR ATTORNEY

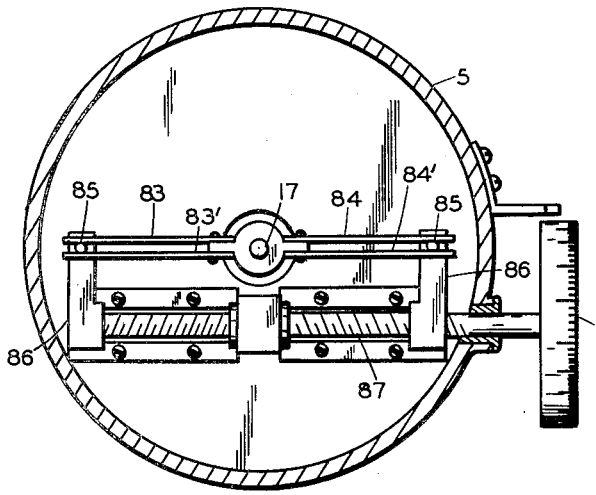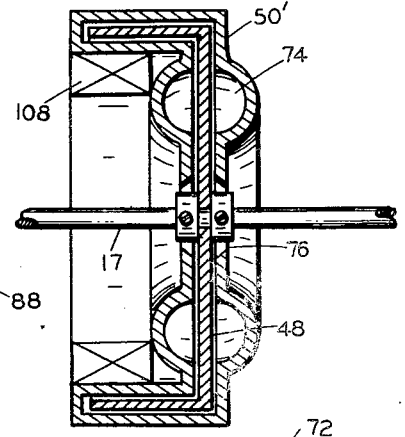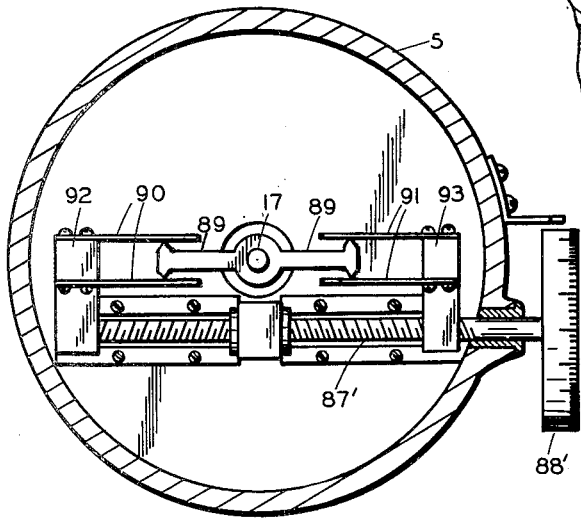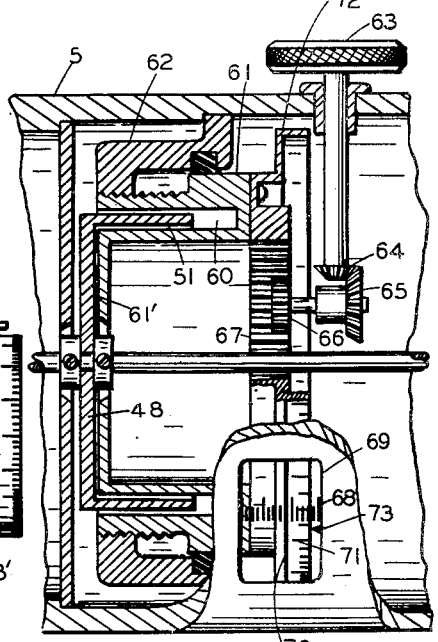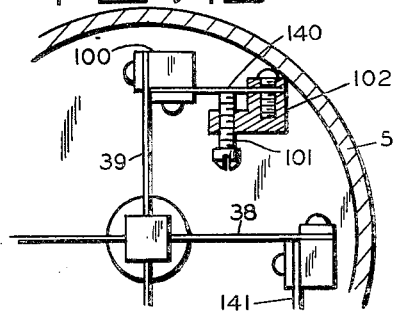
INVENTOR
CHARLES S. DRAPER
EDWARD P. BENTLEY
BY Herbert H. Thompson
THEIR ATTORNEY

Patented Sept. 28, 1954

2,690,014

UNITED STATES PATENT OFFICE 2,690,014

LEAD ANGLE COMPUTER FOR GUN SIGHTS

Charles S. Draper, Newton, and Edward P. Bentley, Wollaston, Mass., assignors, by mesne assignments, to Research Corporation, a corporation of New York Application March 29, 1941, Serial No. 385,916

1 Claim. (Cl. 33—49)

This invention relates to fire control devices to aid in the aiming of guns, especially of the anti-aircraft type, wherein the speed of the target is relatively great. In such devices the factor of primary importance is to obtain quickly and preferably directly from the movement of the line of sight or gun itself the angular rate thereof in one or more planes and in such form that said rate may be directly applied to automatically advance the gun position ahead of the sight an amount proportional to such rate, modified by the time of flight of the shell.

Many forms of rate devices have been employed in the past for such determination, one satisfactory form being shown, for instance, in the prior patent to Chafee et al. No. 2,206,875, dated July 9, 1940, for Fire Control Devices. In most of such systems, however, complicated or delicate variable speed drives are employed, which are capable of functioning only over a limited range of rates and which give not the actual angular rate of the gun or sight in space, but such rate with respect to the plane of the mount, that is, the plane of the ship's deck where the gun is employed on shipboard.

According to our invention, we propose to greatly simplify and improve such devices by mounting preferably directly on the gun (which may be real or dummy) one or more angular rate or rate of turn gyroscopes which respond directly to the angular movements of the gun in space and without reference to the ship's movements. Preferably two of such gyroscopes are employed, one for measuring angular movements in elevation and the other angular movements in train. As well understood in the art, for sufficiently small angles of precession, the extent of precession of such a gyroscope against a centralizing spring is proportional to the angular rate being measured, and its direction of precession varies with the angular direction. We therefore propose to directly connect such a gyroscope to the sight itself so that the sight is displaced with respect to the gun through angles in azimuth and elevation proportional to the respective angular rates. Preferably, also, we introduce a factor proportional to range or time of flight of the shell.

We also employ a new and improved type of rate gyroscope in this connection, since the conventional type does not give sufficiently constant and accurate indication for the purposes of this invention. The indications given by conventional gyroscopic turn indicators which use ball bearings for suspending the gimbal frame are particularly subject to errors for small angles of precession due to erratic effects in the bearings which support the gimbal. The type of gyroscope we prefer to employ is an improvement in the type shown in the prior application of one of the joint inventors, C. S. Draper, for Turn Indicators, now Reissue Patent No. 22,330 dated June 8, 1943, in which no bearings in the ordinary sense are employed for the precession axis of the gyroscope, a leaf spring suspension being utilized instead. Other special features of our improved gyroscope are described hereinafter.

Referring to the drawings, showing several forms our invention may assume,

Fig. 1 is a diagrammatic perspective view illustrating our rate of angular elevation and train gyros connected to the sighting cross hairs on a gun.

Fig. 2 is a side elevation of a gun with our sight mounted thereon.

Fig. 3 is a section through the casing of one of the rate gyros employed in our invention, showing the details of the suspension and damping means employed.

Fig. 4 is an end elevation of such gyro, showing one means for adjusting the spring stiffness in accordance with the time of flight of the shell.

Fig. 5 is a detailed side elevation of one of the damping discs employed in this gyroscope.

Fig. 6 is an end elevation of a modified form of spring torsion-stiffness adjustment for changes in range or time of flight.

Fig. 7 is a detail, on a larger scale, of the spring adjustment shown in Fig. 4.

Fig. 8 is a detail, on a larger scale, of the spring adjustment shown in Fig. 6.

Fig. 9 shows a modified form of the invention in which the spring stiffness is adjusted by an alternative method.

Fig. 10 shows still another and in some respects superior method of varying the spring stiffness.

Fig. 11 is a sectional detail of a modified form of damper.

Fig. 12 is a vertical section of a modified form of damper providing a ready adjustment of the damping coefficient.

Fig. 13 is a detail showing a modified form of spring suspension for the gyroscope.

Our invention is shown in Fig. 2 as mounted on a gun 1 which is mounted in the usual manner on a base 2 for rotation in azimuth by handwheel 3 and adjustment in elevation about trunnions 4' by handwheel 4. Our entire predictor or sight adjusting means may be mounted within a box 5 on which the rear sight 6 is positioned. For the sake of simplicity such details as the shock mounting to prevent damage from gun fire are omitted. The forward sight is represented diagrammatically as a pair of cross bars or cross hairs 7 and 8, the former being mounted on the end of a rod 9 pivoted on a normally horizontal axis 10 so that it may be moved up and down about the trunnion axis 10. A balance weight 11 is shown to balance the mass of the arm 9. Similarly, the cross hair 8 is mounted on the end of an arm 12 pivoted for lateral movement in azimuth about a trunnion axis 13 perpendicular to the gun barrel, said arm also being counterbalanced by mass 11'.

The cross hairs 7 and 8 are shown as moved directly from the precessional movements of a pair of constrained angular rate gyroscopes 14 and 15, one of which is responsive to tilt of the gun in elevation and the other to turning in azimuth. In Fig. 1, only the rotors and rotor bearing frames are shown for simplicity, reference being had to Fig. 3 for the special mounting and for the centralizing and damping factors of each of these gyroscopes. As shown in Fig. 1, the gyro 14 is mounted with its two degrees of freedom at right angles to the gun trunnions 4'—4', i. e., it is mounted for precession about a trunnion axis 16 which may be parallel to the gun barrel, and with its spin axis 14' normally vertical or perpendicular to the gun barrel. The other gyroscope, 15, on the other hand, is shown as having its trunnions 17 parallel to the trunnions 16, with its spin axis 15' normally horizontal or at right angles to axis 14' so that it is responsive to turning of the gun in azimuth. Therefore, angular movements of the gun in elevation will cause precession of the gyro 14 in one direction or the other through an angle proportional to said rate of movement, thus moving up and down an arm 20 connected to trunnion 16. The arm 20 may be directly connected to move the bar 7 up and down, but in the form shown in Fig. 1 we interpose an adjustable mechanism which may be set in accordance with the estimated range or time of flight of the shell. As shown, the inner end of the arm 20 is connected through a link 21 to a rocker arm 22 pivoted on a pin or set screw 23 secured in a T-shaped adjustable block 24, slidably mounted at one edge in a U-shaped trackway 29 in a fixed support 30 and at the other edge by means of a set screw 27 passing through a slot 28 in said block. The other side of said rocker arm is connected through a link 25 to the bar 9 to rock the same about the pivot 10. In the position shown in Fig. 1, the rod 25 is moved equally and oppositely to the rod 21, but it will be evident that by varying the position of the pivot 23 in the slot 26 of rocker 22, the ratio of movement may be varied. This adjustment may be conveniently made by sliding the block 24 laterally in the trackway 29. A suitable range or time of flight scale 31 may be provided on top of the rocker arm 22, which may be read in connection with the index 33.

Similarly, the arm 20' on trunnion 17 is preferably connected to the arm 12 through similar variable linkages consisting of a rod 21', rocker arm 22' and rod 25', the pivot point 23' of the rocker arm being adjustable in accordance with range by being slidable with the slidable block 24', as before. The time of flight or range scale in this instance is shown as 31' and the index as 33'.

Preferably, means are provided for quickly and simultaneously adjusting both pivots 23 and 23' in accordance with the range. This is represented diagrammatically in Fig. 1 by providing each slide 24, 24' with rack teeth with which pinions 103 and 103' mesh, each pinion being turned from a common setting knob and range dial 104. The range dial is shown as mounted on the shaft 105 of pinion 103 and the pinion 103' is turned therefrom by bevel gears 106 and shaft 107.

For the proper functioning of this apparatus we find certain constructional factors of the gyroscope are quite important, one of the gyroscopes being shown in detail in Fig. 3. The rotor 35, which may be spun by any suitable means such as by an air jet 36, is shown as journaled in the rotor bearing frame 37. Instead of employing the usual ball bearings to support the horizontal trunnions 17 of the gyroscope, we have shown the trunnions as supported by a plurality of leaf springs 40, 40', 41 and 41' symmetrically arranged around each trunnion 17 and connected to the trunnion by radially extending tension members 38, 39, which are shown as in the form of leaf springs passing through slots in the trunnion and tightly clamped therein at their center. These latter springs or tension members are preferably made quite flexible, being constructed of thin spring steel or beryllium copper. At its outer end, each tension member is tightly clamped to the free end of the adjacent leaf spring 40, 40', 41, 41', as by riveting or by clamps. This group of springs, which may be referred to as the springs subject to bending strain, are preferably made of stiffer material than tension members 38 and 39, such as relatively stiff spring steel, and are shown as having their outer ends bent at right angles to the main body, where they are clamped to the tension members 38, 39. It will be seen that upon precession of the gyroscope, each trunnion 17 will be turned, thus twisting the members 38, 39 and pulling their outer ends inwardly against the spring force of the bending strain springs. While this resistance to precession is mainly exerted by the bending springs through the connecting tension members 38, 39, there is also a slight force exerted due to the bending of the members 38, 39. The group of bending strain springs 40, 40', 41, 41' are preferably adjustably mounted so as to exert a variable, yielding, centralizing torque on the trunnions through the members 38 and 39 in order to accomplish one or both of the following purposes, namely, to vary the rate of movement of the gyroscope in accordance with the time of flight of the shell and/or to provide the correct variation of the characteristic time of the gyroscope with the time of flight of the shell. The ends of the springs are accordingly shown as wound in the form of a spiral 42 (Fig. 7), the inner end being secured to a sleeve 43 rotatably mounted on a stud or set screw 44. Normally, the sleeve is clamped by screwing down on the set screw by turning the head 45, but when it is desired to change the spring characteristic, the set screw is loosened and the sleeve turned with reference to the time of flight scale 46 or sleeve 43 and the fixed index 47, and the set screw is then reclamped in the new position. Each leaf spring may have a similar spiral formation and tension adjusting means.

A somewhat different form of spring suspension is shown in Fig. 13, which avoids bending the ends of either leaf spring. According to this form, the outer end of each of the thin torsion-tension springs 38 and 39 is clamped to one face of a square block 100, while the free ends of the short heavier springs 140, 141 are clamped to a face of said block normal to said other face. Preferably, also, we provide an adjustable set screw 101 in the fixed bracket 102 supporting the clamped end of each spring 140, 141, so that the bending stiffness of said springs 38 and 39 may be adjusted at will by varying the tension exerted thereon by springs 140, 141.

We also prefer to provide a strong damping means for the gyroscope, preferably one which not only damps the precessional movements thereof but also suppresses any bouncing or oscillation of the gyroscope in its spring support. Such damping means is shown in the form of a cup-shaped disc 48 secured to each trunnion 17 and preferably slotted, as shown in Fig. 5 at 49, to permit ready and even distribution of the oil in which the disc is immersed in whole or in part. The oil is shown as enclosed within a close fitting box 50. Each disc has a substantial rim portion 51 also immersed in oil, so that the discs interpose a damping resistance to translatory oscillations of the gyro frame in any plane in Fig. 3, as well as to rotary movements due to precession. The rims also materially add to the effective damping of the angular precessional movements.

We have found that for proper performance, the characteristic time of the gyroscope should bear a definite relationship to the time of flight, i. e., should be substantially equal to, but not less than, the time of flight, as otherwise the gyro will not come to rest, but will tend to oscillate so that a smooth rate cannot be obtained. Preferably the characteristic time is made somewhat greater than the time of flight of the shell. The characteristic time may be defined as the time the gyro would require to reach its position of equilibrium or rest when subjected to a sudden change in angular velocity, if it were to maintain its initial rate of precession until it reached such position. Mathematically, this characteristic time ($\tau$) may be expressed as the time required for the gyroscope to complete a displacement of $$\left(1-\frac{1}{e}\right)$$

of its final precession angle when it is suddenly subjected to a constant angular velocity about the axis around which it is turn sensitive (where $e$ is the base of natural logarithms). Preferably the damping employed is sufficiently strong so that the precessional response to a sudden change in angular velocity is a substantially simple exponential function which may be expressed as $$\frac{\theta_t}{\theta_0} = 1 - (e)^{-\frac{t}{\tau}}$$

where $\theta_t$ is the angle through which the gyro is precessed at any time $t$, and $\theta_0$ is the total final precessional angle.

One method of varying the characteristic time is by altering the spring tension, as hereinbefore described, which also introduces a correction factor for the time of flight. If, however, the time of flight factor is taken care of by means such as shown in Fig. 1, the characteristic time of the gyro may be varied by varying the damping factor (C) alone, so that in this instance the spring tension may be kept fixed.

The foregoing statements may be made clear by stating the relationships in the form of equations. Thus, the characteristic time of the gyro ($\tau$) is inversely proportional to the spring stiffness (K), so that these relations could be expressed as $$\tau = \frac{C}{K} \quad (1)$$

Similarly, the spring stiffness is preferably made equal to a constant (B) divided by the time of flight ($t_f$) for fire control purposes, or $$K = \frac{B}{t_f} \quad (2)$$

Therefore, Equation 1 may be rewritten as $$\tau = \frac{C}{B} \times t_f \quad (3)$$

As stated in the previous paragraph, the characteristic time of the gyroscope ($\tau$) should be proportional to and slightly greater than the time of flight ($t_f$). If the damping coefficient C is held constant and made slightly greater than B in Equation 3, this condition is fulfilled.

It should of course be also understood that certain damping of the gyroscope is also necessary because of the inability of the human gunner to follow a target smoothly, the damping in this case serving the purpose of smoothing or averaging the rates imparted by the gunner.

From the foregoing it will be seen that it is quite important that the damping factor remain constant at whatever value it is adjusted for, regardless of such external factors as temperature, which have a pronounced influence on the viscosity of the oil used in the damper. In order to prevent changes of the damping factor due to temperature changes, we have shown mounted on the interior wall of each housing 50 enclosing the damping disc and liquid, a ring-shaped heating coil 108, 108', which coils are controlled from any suitable form of thermostat 109 placed against the casing of the instrument in the oil containers. Such thermostats are of known commercial construction and operate to maintain the temperature of the oil constant by varying the amount of heating current flowing through the coils 108 and 108'. Incidentally, this construction also assists in keeping the rotor speed constant, since the rotor bearing friction changes with changes in temperature, which trouble is avoided by keeping the gyro casing at a substantially constant temperature, or at least preventing it falling below a predetermined minimum.

Since the precession of the gyroscope also depends on the speed of the rotor, we find it also important to keep the rotor speed constant. A simple method of accomplishing this purpose is by maintaining a constant differential air pressure at the nozzle 36 as compared to the pressure within the casing 5, in combination with some means for maintaining the temperature substantially constant, as hereinbefore described. For this purpose we insert between the pump supply pipe 110 and the nozzle a pressure regulating sleeve valve 111 which is controlled by a resilient bellows 112. The interior of the bellows is subject to the intake pressure, while the exterior is subject to the pressure within the casing 5, through exhaust pipe connection 113. It will readily be apparent, therefore, that if the pressure increases beyond the desired amount, the valve will be further closed to maintain the operating pressure constant, and vice versa. In order to prevent speed loss at high altitudes, we also prefer to maintain constant the actual density of the air at the nozzle as well as the relative or differential pressure. In order to accomplish this purpose we have shown a means to prevent the pressure within the case 5 from falling below a selected minimum atmospheric pressure. To this end, we have shown the interior of the case 5 connected through pipe 113 also to the interior of a housing 114 within which is placed a sealed resilient bellows 115 of the aneroid barometer type. As the pressure within the container 114 falls, the bellows expands, thus checking the outflow of air through exhaust port 116 so that the pressure within the casing 5 will not fall below the predetermined setting.

For the purpose of varying the damping coefficient, we may employ mechanism similar to that shown in Fig. 12. In this case the rim 51 of damping disc 48 is enclosed in an annular chamber 60 within a hollow member 61 threaded or otherwise adjustably mounted in a fixed bracket 62 within the main casing 5. Said member 61 may be rotated to advance it toward or retract it from the disc 48 by means such as a knob 63 journaled in casing 5 and having a bevel pinion 64 thereon meshing with a bevel gear 65, thereby turning a pinion 66 meshing with an internal gear 67 secured to the rotatable housing 61. It will be evident that by laterally adjusting the housing 61, the closely adjacent areas of the relatively movable surfaces are varied, and also the clearance between the body of disc 48 and the movable wall 61', whereby the damping coefficient is readily varied. As a means for gauging the adjustment, we have shown a scale 68 engraved on a window 69 at the bottom of the casing, on which index line 70 may be read. A vernier scale 71 may be provided, if desired, on the periphery of a ring 72 secured to member 61, which scale is readable upon index 73.

In Fig. 11, an improved form of oil container is shown surrounding the disc 48, which is designed especially to prevent oil from running out in case the device is tilted. According to this form, the container 50' is provided with a large annular channel or torus 74 of sufficient capacity so that the oil level will never rise to the level of the aperture 76 through which the trunnion shafts 17 pass.

From the foregoing it is obvious that our invention may assume many different forms. Thus, the spring stiffness may be varied by means widely different from that shown in Fig. 4. Thus, in the form of the invention shown in Figs. 6 and 8, the tension of the supporting and centralizing springs 38', 39' is left unchanged while the effective spring stiffness is varied by altering the effective stiffness of an auxiliary leaf spring 77 also secured to the trunnion 17. In this case, the stiffness is shown as changed by varying the points at which the free end is clamped. As shown, each free end thereof is placed between a pair of knife edge blocks 78 which are adjustable toward and away from trunnion 17 by being mounted on a slider 79 slidably mounted in a trackway 80. The adjustment of the slider may be shown on scale 81 by a pointer 82. Suitable means (not shown) may be provided for moving the two sliders equally and oppositely.

A somewhat similar adjustment is shown in Fig. 9. In this case the trunnion 17 has secured thereto two pairs of parallel leaf springs 83, 83' and 84, 84'. Between the free ends of the members of each pair is shown a pin 85 which is radially adjustable as by being mounted on a block 86 threaded on a rotatable threaded shaft 87. The two ends of the shaft 87 are oppositely threaded so that the two pins 85, 85 are moved equally and oppositely upon rotation of the shaft. The radial adjustment of the same may be read on graduated range dial 88.

A still further improvement is shown in Fig. 10. This possesses the advantage that as the spring tension is increased, the lever arm is not also decreased as is true in the forms of the invention shown in Figs. 6 and 9. According to the form shown in Fig. 10, the trunnion 17 has secured thereto a pair of oppositely extending arms 89 having knife ends, against each end of which yieldingly press pairs of leaf springs 90 and 91 clamped to blocks 92 and 93 at the outer ends. It will be readily apparent that by adjusting the blocks toward and away from the knife edges, as by turning the graduated dial 88' on oppositely threaded shaft 87', the stiffness of the springs may be varied at will with reference to the time of flight or range.

It will be understood, of course, that other factors or corrections may be introduced through varying the spring stiffness, if desired, such as ballistic corrections, spotting corrections, etc.

It will also be understood that the application of our invention is not limited to the direct displacement of the sight with respect to the gun, or vice versa, but that our invention may be applied to other types of fire control systems wherein the correction is applied by measuring the angular movements of the sight itself instead of the gun. Thus, our invention may be applied to any fire control predictor to measure and introduce the angular rate in azimuth and elevation or in a slant plane. It will also be understood that the gun mentioned throughout this specification may be a "dummy," the motions of which are transmitted in any suitable manner to the real gun, as is well known in the art.

Our improved gyro also has other marked differences from ordinary rate of turn gyroscopes. According to our invention, the maximum precessional movement of the gyroscope in either direction is made small as compared to the practice in the prior art, so that the errors introduced by large angle precessional movements of the gyroscope away from its centralized position are minimized. In our gyroscope, also, the frictional resistance to precession is negligible as compared to the moment of inertia of the gyroscope. At the same time, a large usable indication is obtained of the rate by suitable multiplying devices for multiplying the small angular movements of the gyroscope, such as the multiplying linkages and levers shown diagrammatically in Fig. 1. In addition, the damping coefficient is made much larger than in the present practice so that the inertia effects about the precession axis become comparatively negligible and one or both of the spring stiffness and damping (preferably the former) are made adjustable in order to preserve the proper relationship between the characteristic time ($\tau$) of the gyroscope and the time of flight of the shell.

Our all-spring type trunnion or pivotal support for the gyroscope is also especially advantageous since it virtually eliminates variable changes in the normal or centralized position of the gyroscope which frequently arise when ordinary bearings are employed, either as pivotal supports or merely as guides, due to sticking and variable coefficients of friction near the centralized position where the forces are extremely small, or due to dirt or grit in the gimbal pivots.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

In order to issue in one patent claims on subject matter common to the within application and continuation-in-part application Serial No. 440,660, now Patent No. 2,609,606, issued September 9, 1952, for Gunsight Having Lead Computing Device, most of the claims originating in this application were transferred during the prosecution to the aforesaid application Serial No. 440,660 and therefore appear in the aforesaid patent.

Having described our invention, what we claim and desire to secure by Letters Patent is:

An angular rate generating device for fire control, comprising a gyroscopic rotor and rotor bearing frame, a trunnion axis for said frame including resilient means for both pivotally supporting and yieldingly centralizing said frame without guiding bearings, a damping means for damping precessional movements of said frame about said axis and for shock mounting the frame, and means for adjusting the strength of the damping means for range changes, whereby the characteristic time of the gyroscope may be made substantially equal to the time of flight of the shell.

References Cited in the file of this patent

UNITED STATES PATENTS

| Number | Name | Date |
|---|---|---|
| 1,359,333 | Cowles | Nov. 16, 1920 |
| 1,610,930 | Colvin | Dec. 14, 1926 |
| 1,936,442 | Willard | Nov. 21, 1933 |
| 2,006,112 | Reid | June 25, 1935 |
| 2,047,186 | Bates | July 14, 1936 |
| 2,232,537 | Kollsman | Feb. 18, 1941 |
| 2,260,396 | Otto | Oct. 28, 1941 |
| 2,291,612 | Draper | Aug. 4, 1942 |
| 2,464,195 | Burley et al. | Mar. 8, 1949 |

FOREIGN PATENTS

| Number | Country | Date |
|---|---|---|
| 162,304 | Great Britain | May 5, 1921 |
| 181,164 | Great Britain | June 15, 1922 |